F. W. PERROTT.

Assignor, by mesne assignments, to P. H. McGraw.

Corset.

No. 8,361. Reissued Aug. 6, 1878.

Attest:
Fred. Benjamin
E. A. Welch

Inventor
F. W. Perrott
By his attorney
Charles E. Foster

N. PETERS, PHOTO-LITHOGRAPHER, WASHINGTON, D. C.

UNITED STATES PATENT OFFICE.

FRANCIS W. PERROTT, OF McGRAWVILLE, NEW YORK, ASSIGNOR, BY MESNE ASSIGNMENTS, TO P. H. McGRAW, OF SAME PLACE.

IMPROVEMENT IN CORSETS.

Specification forming part of Letters Patent No. 186,043, dated January 9, 1877; Reissue No. 8,361, dated August 6, 1878; application filed May 15, 1878.

*To all whom it may concern:*

Be it known that I, FRANCIS W. PERROTT, of McGrawville, Cortland county, New York, have invented an Improved Corset, of which the following is a specification:

The object of my invention is a corset so made as to be economically manufactured and to nicely fit the body of the wearer, imparting to the form an elegant and perfect appearance.

Figure 1:
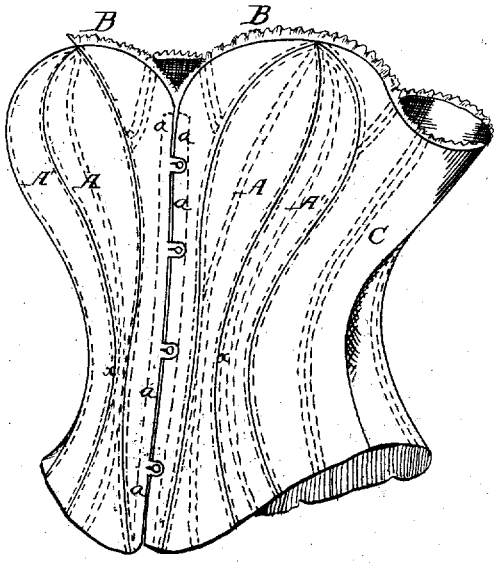
Figure 2:
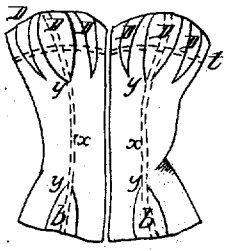

In the accompanying drawing, which forms part of this specification, Figure 1 is an external view of my improved corset, and Fig. 2 a view showing a corset of the usual construction.

B B are the front sections, having the usual breast-receptacles, and C is the side or under-arm section. The seams connecting said sections are denoted by solid black lines, the dotted lines representing the stitching and bone pockets.

The usual steel hooks or clasps are secured at the edges of the front breast-sections, and the back-sections are provided with the usual eyelets for lacing.

In ordinary "bosom-pad" corsets—that is, corsets having a fullness below the upper edge, forming breast-receptacles—the requisite fullness is usually produced by means of elliptical short gores or pieces inserted in slits made at the top in the breast-pieces, extending about one-third the length of the sections, the hip and waist fullness being produced by a gore or gores inserted in slits in said pieces at the bottom. (See diagram, Fig. 2.)

In other cases one continuous section is used for the central bosom-piece and lower gore, with short gores inserted, one on each side, to complete the breast fullness, while in other cases the corset is composed of longitudinal sections, but which have not the advantages of the peculiar conformation of the sections of my corset. Such constructions are objectionable, for the reason that it is impossible to impart the perfect symmetrical form which can be given them when manufactured as herein described, and because the insertion of gores requires nice workmanship and increases the cost of production, while the breast-receptacles, instead of being nicely rounded, are flat at parts, impairing the appearance of the article and rendering the use of cross-ribs absolutely essential.

By my invention these objections are obviated, enabling me to avoid the slitting of the front sections, and to dispense with the short gores. I produce the requisite fullness by the four pieces or darts, which constitute or aid in forming the body of the corset at the front, each section varying in width as is requisite to give the desired rounded shape, each being narrow at the waist, and the central sections *a a'*, united on a central seam, *x*, tapering each from both sides at the top. Thus all the seams, uniting the four pieces at the front, are in nearly straight lines, which may be easily sewed by machine, and no bones cross the seams, while the ordinary cross bust-bone *t* required in corsets of the usual form need not be employed. Thus constructed, the corset may be made with facility by unskilled workmen.

A continuous breast piece or strip, running from edge to edge, is found described and shown in the patent granted L. C. Warner, January 11, 1876; but such I do not claim broadly; but

What I claim is—

1. In a corset constructed to extend over and having hollow receptacles for the breasts, the continuous central front sections, A A', extending each to the upper edge, united at a central seam, and with the sections on each side aiding in imparting the desired rounded form to the hollow receptacles, all as described.

2. The bosom-pad corset, having two central darts at each side, united on a central seam, *x*, and extending through the breast-receptacle, and each tapering from each side to a point at the upper end, as specified.

3. A bosom-pad corset, with front sections B B, having central darts A A' and under-arm sections C, all constructed and combined substantially as and for the purpose described.

In testimony whereof I have signed my name to this specification in the presence of two subscribing witnesses.

F. W. PERROTT.

Witnesses:
P. W. CHAFFEE,
A. P. McGRAW.